(12) United States Patent
Lan et al.

(10) Patent No.: US 10,132,423 B1
(45) Date of Patent: Nov. 20, 2018

(54) HANDHELD SHOWER UNIT WITH WATER OUTLET STATE SWITCHED THROUGH A KEY

(71) Applicant: Kylin Sanitary Technology (Xiamen) Co., Ltd., Xiamen (CN)

(72) Inventors: You Hui Lan, Xiamen (CN); Hai Huang Xiao, Xiamen (CN); Cun Gui Lai, Xiamen (CN); Hui Huang, Xiamen (CN); Qing Shuang Li, Xiamen (CN)

(73) Assignee: KYLIN SANITARY TECHNOLOGY (XIAMEN) CO., LTD., Xiamen, Fujian Province (CN)

( * ) Notice: Subject to any disclaimer, the term of this patent is extended or adjusted under 35 U.S.C. 154(b) by 0 days.

(21) Appl. No.: 15/783,788

(22) Filed: Oct. 13, 2017

(30) Foreign Application Priority Data

Jul. 10, 2017 (CN) .......................... 2017 1 0556116

(51) Int. Cl.
| F16K 31/60 | (2006.01) |
| B05B 1/30 | (2006.01) |
| B05B 1/18 | (2006.01) |
| E03C 1/04 | (2006.01) |

(52) U.S. Cl.
CPC ............ *F16K 31/602* (2013.01); *B05B 1/185* (2013.01); *B05B 1/3026* (2013.01); *E03C 1/0409* (2013.01)

(58) Field of Classification Search
CPC ...... F16K 31/53; F16K 31/535; F16K 31/602; B05B 1/185; B05B 1/3026; B05B 1/1636; E03C 1/0409

USPC ....................................... 239/443–447, 581.1
See application file for complete search history.

(56) References Cited

U.S. PATENT DOCUMENTS

| 5,433,384 | A | * | 7/1995 | Chan | ..................... B05B 1/1636 239/239 |
| 6,622,945 | B1 | * | 9/2003 | Wu | ........................ B05B 1/1654 239/443 |
| 8,066,203 | B2 | * | 11/2011 | Zhou | ..................... B05B 1/1636 239/443 |
| 9,427,749 | B2 | * | 8/2016 | Zhou | ..................... B05B 1/1636 |
| 9,795,974 | B2 | * | 10/2017 | Zhou | ........................ B05B 1/18 |
| 9,901,939 | B2 | * | 2/2018 | Lin | ........................ B05B 1/1636 |
| 2005/0258274 | A1 | * | 11/2005 | Wang | ..................... B05B 1/1636 239/393 |

(Continued)

*Primary Examiner* — Christopher Kim
(74) *Attorney, Agent, or Firm* — Muncy, Geissler, Olds & Lowe, P.C.

(57) ABSTRACT

A handheld shower unit with the water outlet state switched through a key, comprises a water outlet assembly mounted at one end of a housing and provided with water outlet channels, a water inlet pipe communicates with the water outlet channels through a switching valve which comprises a valve body, the key, a transmission swing rod, a sliding rod, a reset spring, a driving disc, a driving shaft, a ratchet wheel, a pawl, and a water distribution pan which is provided with water distribution holes corresponding to different water inlets; the key is pressed which rotates the transmission swing rod, which pushes the sliding rod, which rotates the driving disc so that the pawl hinged to the driving disc can drive the ratchet wheel to rotate, which then drives the driving shaft and the water distribution pan to rotate. Single-hand operation, high switching speed and high reliability can be achieved.

10 Claims, 13 Drawing Sheets

(56) References Cited

U.S. PATENT DOCUMENTS

| | | | |
|---|---|---|---|
| 2012/0305116 A1* | 12/2012 | Zhou | B05B 1/1636 |
| | | | 137/625.46 |
| 2014/0014743 A1* | 1/2014 | Schorn | B05B 1/16 |
| | | | 239/447 |
| 2014/0027234 A1* | 1/2014 | Zhou | B05B 1/1636 |
| | | | 192/43.1 |
| 2015/0238984 A1* | 8/2015 | Lee | B05B 1/1609 |
| | | | 239/447 |

* cited by examiner

HANDHELD SHOWER UNIT WITH WATER OUTLET STATE SWITCHED THROUGH A KEY

BACKGROUND OF THE INVENTION

Technical Field

The invention relates to the technical field of manufacturing of bathroom equipment, in particular to a handheld shower unit with the water outlet state switched through a key.

Description of Related Art

When the water outlet state of a traditional handheld shower unit needs to be switched, a user generally needs to exert force through cooperation of both hands, specifically, the user holds a housing of the shower unit with one hand and rotates a surface cover with the other hand, and the surface cover drives a water outlet assembly to switch water outlet channels so that water can be sprayed out in different forms. By adoption of the traditional switching structure, operation is strenuous, single-hand operation cannot be achieved, and the switching speed is low.

For conveniently switching the water outlet state of shower units and achieving single-hand operation, a shifting wheel structure on the current market is adopted for switching the water outlet state of shower units; however, when the switching mechanism is used for switching the water outlet state of shower units, the intensity of force exerted in operation and the gear are difficult to control, and the switching hand feel needs to be improved.

BRIEF SUMMARY OF THE INVENTION

The invention aims to provide a handheld shower unit with the water outlet state switched through a key; the water outlet state of the handheld shower unit can be switched conveniently through single-hand operation, the switching speed is high, and the reliability is high.

According to the technical scheme adopted by the invention for achieving the above aims: a handheld shower unit with the water outlet state switched through a key comprises a housing provided with a handheld part, wherein a water outlet assembly is mounted at one end of the housing and provided with a plurality of water outlet channels, a water inlet pipe is mounted in the middle of the housing and communicates with the water outlet channels on the water outlet assembly through a switching valve, and the water outlet assembly is provided with a plurality of water inlets communicating with the multiple water outlet channels respectively;

the switching valve comprises a valve body, the key, a transmission swing rod, a sliding rod, a reset spring, a driving disc, a driving shaft, a ratchet wheel, a pawl and a water distribution pan, wherein the valve body is mounted in the housing, the water distribution pan is located between the valve body and the water outlet assembly and provided with at least one water distribution hole, a water channel is formed in the valve body, one end of the water channel communicates with the water inlet pipe, and the other end of the water channel communicates with the water distribution holes on the water distribution pan;

the key is hinged to the valve body or the housing and exposed out of the housing, the transmission swing rod is hinged to the valve body or the housing, the driving shaft is pivoted to the valve body and fixedly connected with the ratchet wheel and the water distribution pan in the circumferential direction, the driving disc is pivoted to the driving shaft, the pawl is hinged to the driving shaft, one end of the sliding rod is hinged to the driving disc, and the reset spring is mounted between the valve body and the sliding rod;

the key is pressed to drive the transmission swing rod to rotate, the transmission swing rod pushes the sliding rod to move, the sliding rod drives the driving disc to rotate so that the pawl hinged to the driving disc can drive the ratchet wheel to rotate, the ratchet wheel then drives the driving shaft and the water distribution pan to rotate, and thus the water distribution holes in the water distribution pan can correspond to different water inlets on the water outlet assembly.

According to the further improvement, a concave hole is formed in one end of the driving shaft, a groove is formed in the middle of the side, close to the valve body, of the water distribution pan, and one end of the driving shaft is inserted into the groove, so that the driving shaft and the water distribution pan are fixedly connected in the circumferential direction; a first compression spring is mounted in the concave hole, one end of the first compression spring abuts against the water distribution pan, the other end of the first compression spring abuts against the driving shaft, and the first compression spring drives the water distribution pan to draw close to the water outlet assembly. In this way, the airtightness and reliability of water distribution are further improved.

According to the further improvement, a clamping groove is formed in the outer circumferential surface of the other end of the driving shaft, and a U-shaped ring is mounted in the clamping groove and used for preventing the ratchet wheel and the driving disc from disengaging from the driving shaft. In this way, assembling can be conducted quite conveniently.

According to the further improvement, a sliding rail is arranged on the valve body, and the middle portion of the sliding rod is matched with the sliding rail; a stop pawl is mounted on the valve body, one end of the stop pawl is matched with a tooth groove of the ratchet wheel, and the stop pawl is used for preventing the ratchet wheel from rotating reversely. In this way, the reliability of the switching motion is improved.

According to the further improvement, the driving disc is provided with a first protrusion in the axial direction, and a second compression spring is mounted between the first protrusion and the pawl and drives the driving end of the pawl to lean against the tooth groove of the ratchet wheel; two angle limiting protrusions are arranged on the valve body, the driving disc is provided with a second protrusion in the radial direction, and the second protrusion is matched with the two angle limiting protrusions to limit the forward-rotation angle and the reverse-rotation angle of the driving disc. In this way, the rotation angle of the water distribution pan can be controlled accurately, and the reliability of switching of the water outlet state is further improved.

According to the further improvement, a first guide column is arranged on the sliding rod, a second guide column extends from the valve body, the first guide column and the second guide column are sleeved with the reset spring, and the first guide column and the second guide column are staggered in position. In this way, normal functions of the reset spring can be ensured.

According to the further improvement, the water outlet assembly comprises a water outlet base, and the multiple water outlet channels are arranged on the water outlet base;

a first annular protrusion is arranged on the side, close to the valve body, of the water outlet base, a second annular protrusion is arranged on the side, close to the water outlet base, of the valve body and connected with the first annular protrusion in a sleeving mode, the water distribution pan is located in the middle of the first annular protrusion, and the multiple water inlets are formed in the portion, located in the first annular protrusion, of the water outlet base. In this way, the valve body and the water outlet base can be connected easily.

Furthermore, the middle portion of the side, away from the valve body, of the water outlet base is fixedly connected with a water outlet column, a water spray hole is formed in the middle of the water outlet column, the portion, close to the outer side, of the water spray hole is in the shape of a cone which becomes larger from inside to outside, the portion, close to the inner side, of the water spray hole is cylindrical, the cylindrical circumferential surface of the inner side of the water spray hole communicate with a plurality of water inlet grooves, the multiple water inlet grooves communicate with one water outlet channel on the water outlet base, and water entering the water spray hole can be spiral through the multiple water inlet grooves. In this way, the water outlet scope of the middle portion of the shower unit can be effectively expanded, and the rinsing requirement of people is met.

Furthermore, each water inlet groove becomes larger from inside to outside, and a radial air suction hole is formed in the water outlet column and communicates with the water spray hole.

Preferably, the number of the water inlets is six, the six water inlets are evenly distributed on the same circumference, and the number of the water outlet channels on the water outlet base is three; each water outlet channel communicates with two water inlets, two water distribution holes are formed in the water distribution pan, and each water distribution hole is in an arc shape and communicate with one water inlet or can communicate with two water inlets at the same time. In this way, waters can be sprayed out by the shower unit in more combined forms.

According to the invention, when the water outlet state is switched, a user can hold the handheld part of the housing with a single hand and presses or releases the key with the thumb, the transmission swing rod can be driven to rotate after the key is pressed, then the transmission swing rod pushes the sliding rod to move, the sliding rod drives the driving disc to rotate, the pawl hinged to the driving disc drives the ratchet wheel to rotate, the ratchet wheel then drives the driving shaft and the water distribution pan to rotate, and thus the water distribution holes on the water distribution pan can correspond to different water inlets on the water outlet assembly; when the key is released by the thumb, the reset spring can drive the sliding rod to restore, the sliding rod then drives the driving disc to rotate reversely to restore, and the driving disc drives the pawl to restore. In this way, by pressing or releasing the key repeatedly, the water distribution pan can be made to continuously rotate in one direction, the water distribution holes on the water distribution pan are made to correspond to different water inlets on the water outlet assembly so that water can be switched to flow in different water outlet channels, and water can be sprayed out by the shower unit in different forms. By adoption of the handheld shower unit with the water outlet state switched through the key, single-hand operation is achieved, the switching speed is high, and the reliability is high.

DETAILED DESCRIPTION OF THE INVENTION

A further detailed description of the invention is given as follows with accompanying drawings and specific execution modes.

Figure 1:
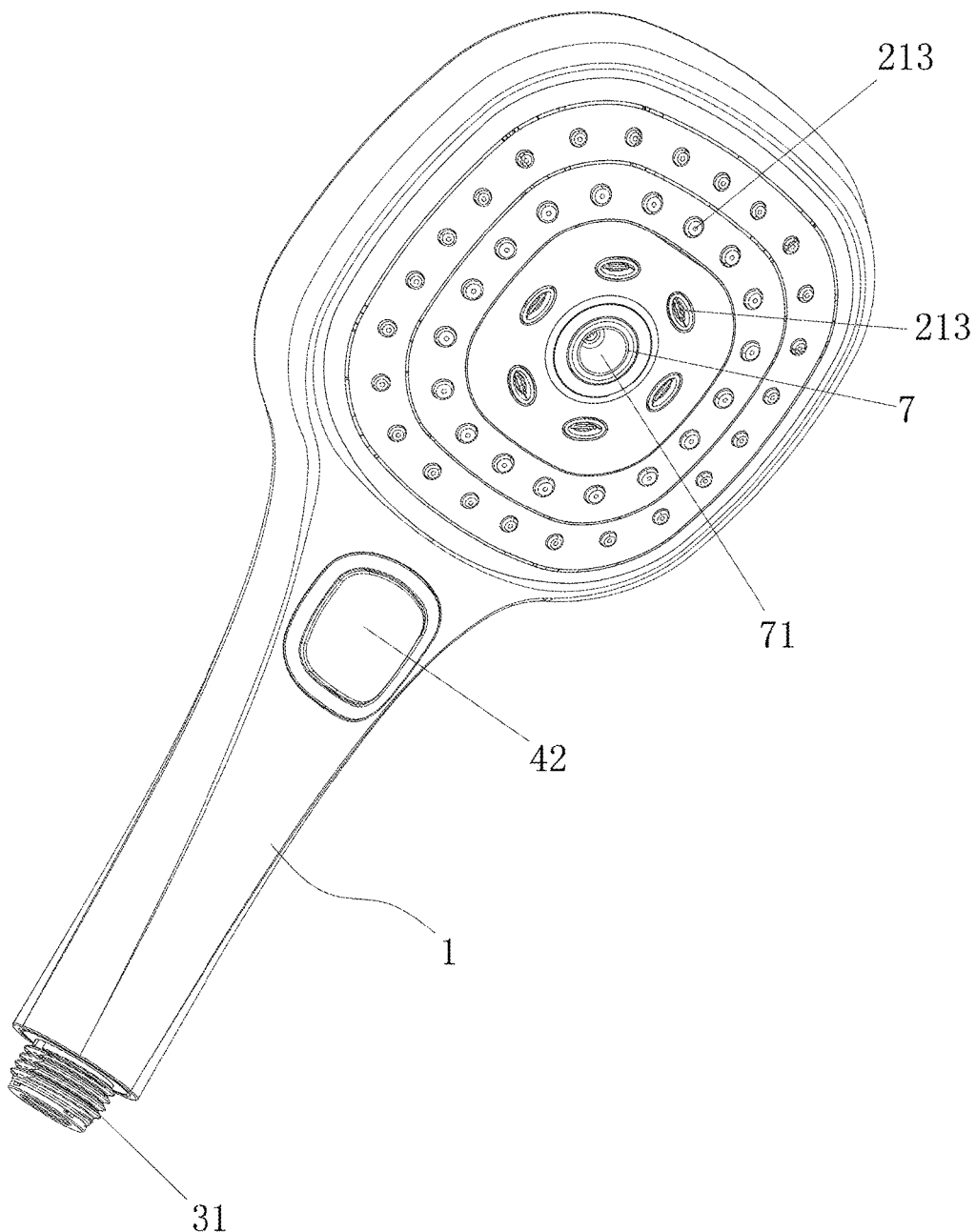
FIG. 1 is a perspective view of the invention.
Figure 2:
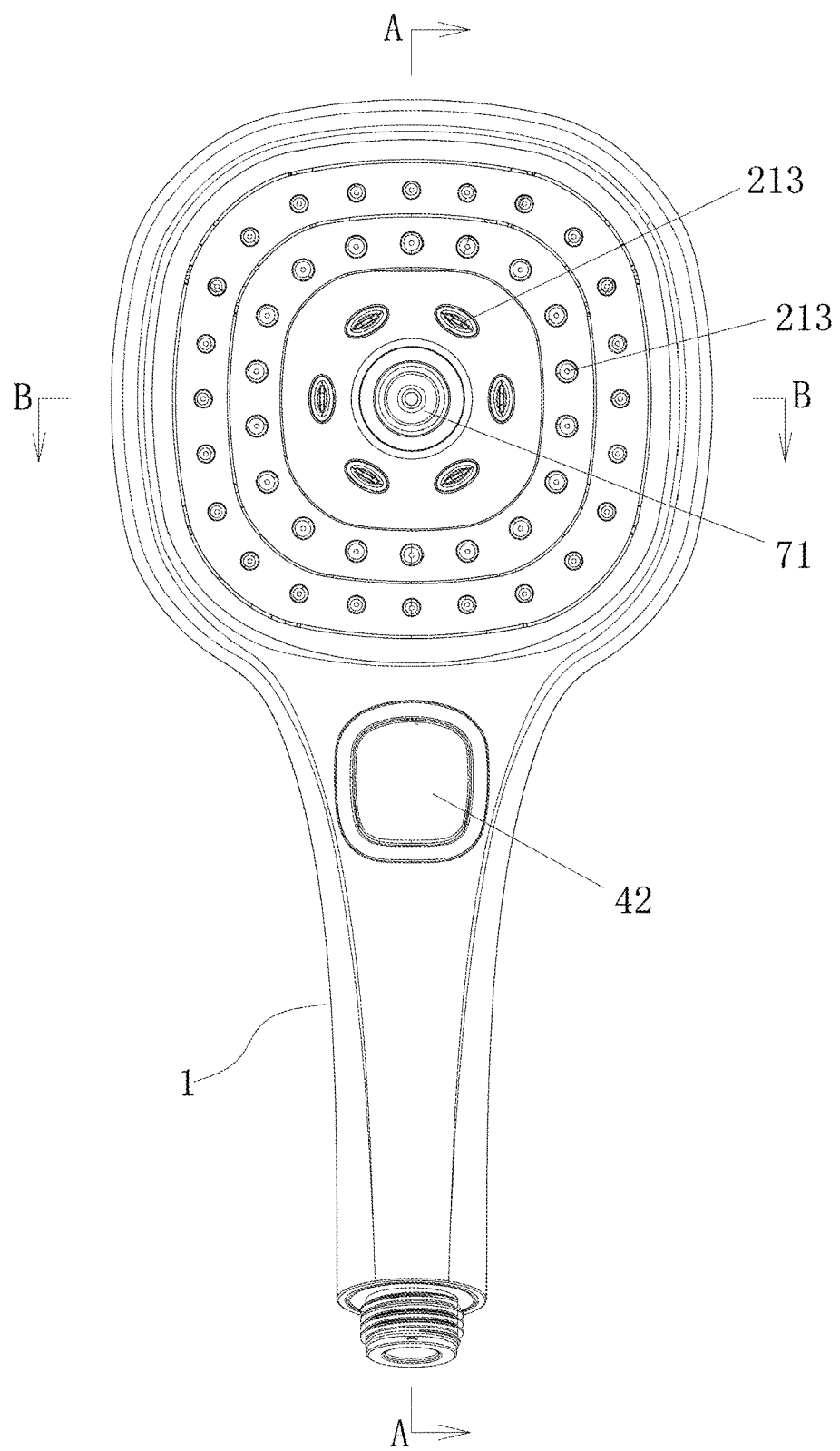
FIG. 2 is a front view of the invention.
Figure 3:
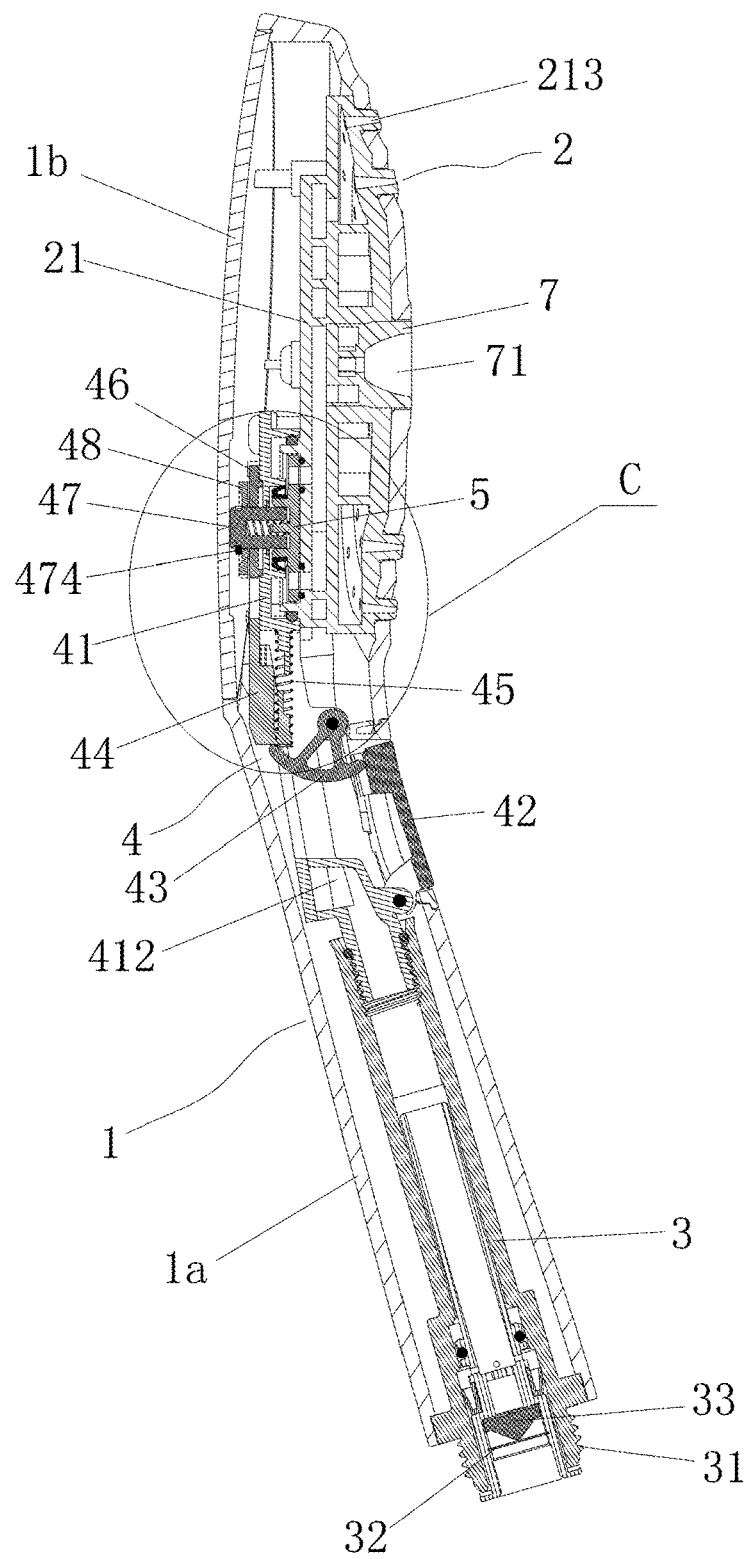
FIG. 3 is sectional view taken along line A-A of FIG. 2.
Figure 4:
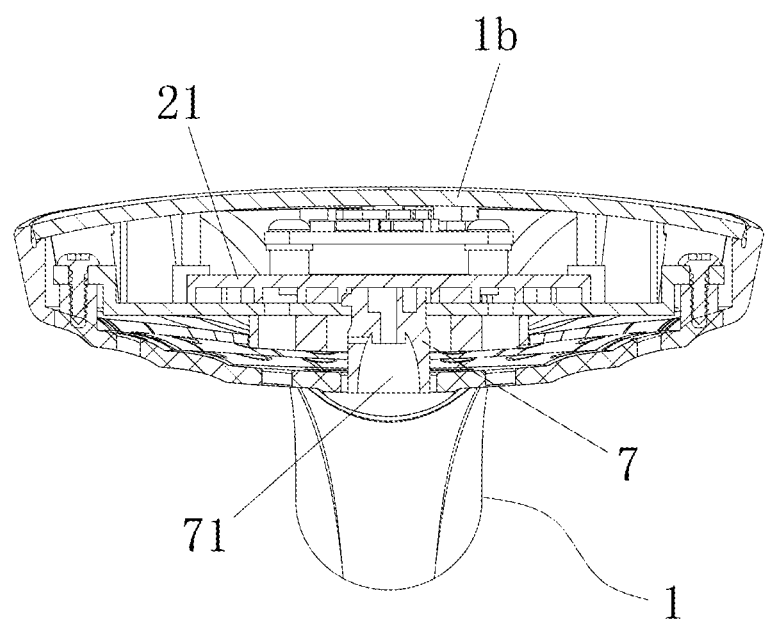
FIG. 4 is a sectional view taken along line B-B of FIG. 2.
Figure 5:
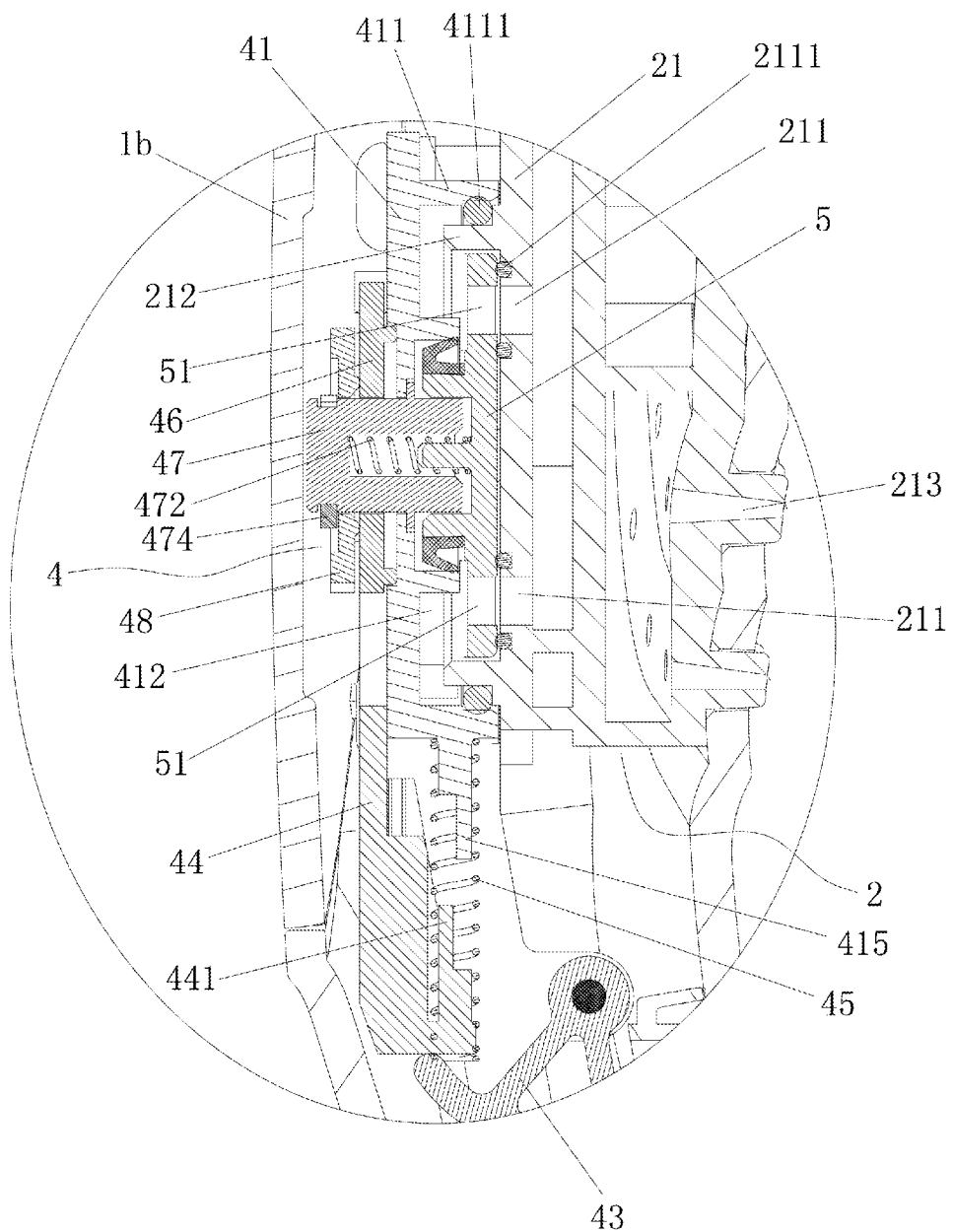
FIG. 5 is an enlarged view of the portion C in FIG. 3.
Figure 6:
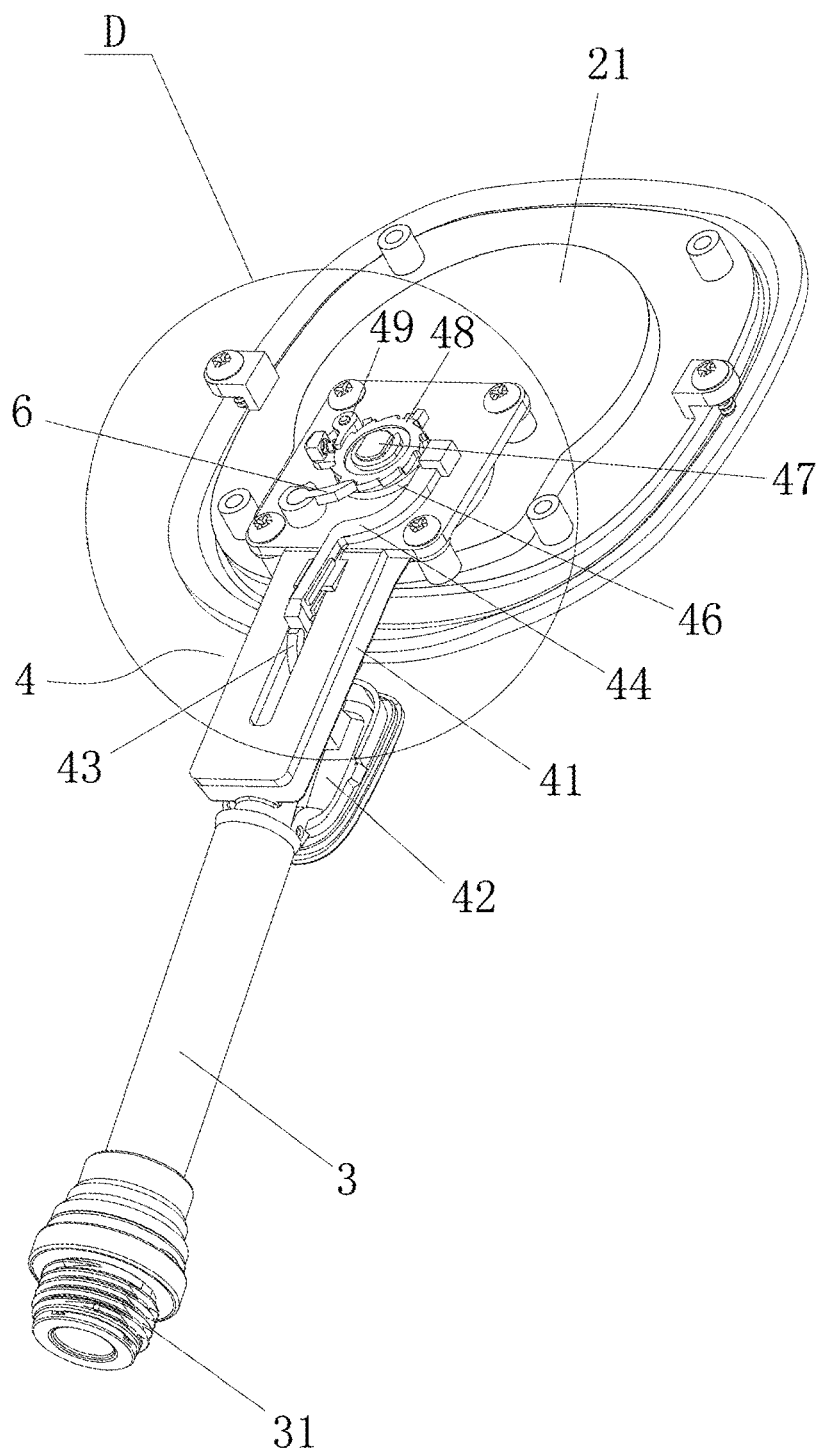
FIG. 6 is a rear perspective view of a hidden housing part of the invention.
Figure 7:
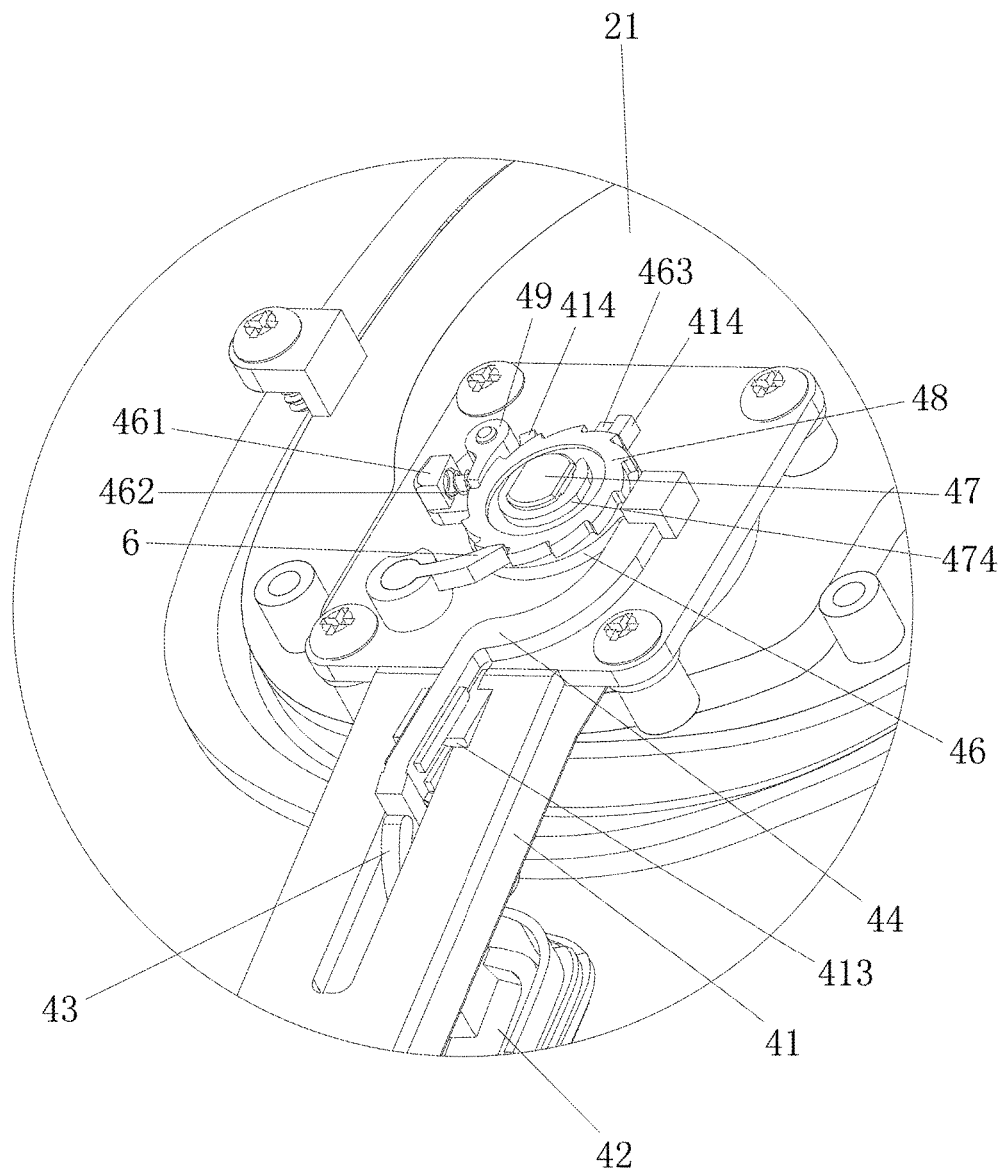
FIG. 7 is an enlarged view of the portion D in FIG. 6.
Figure 8:
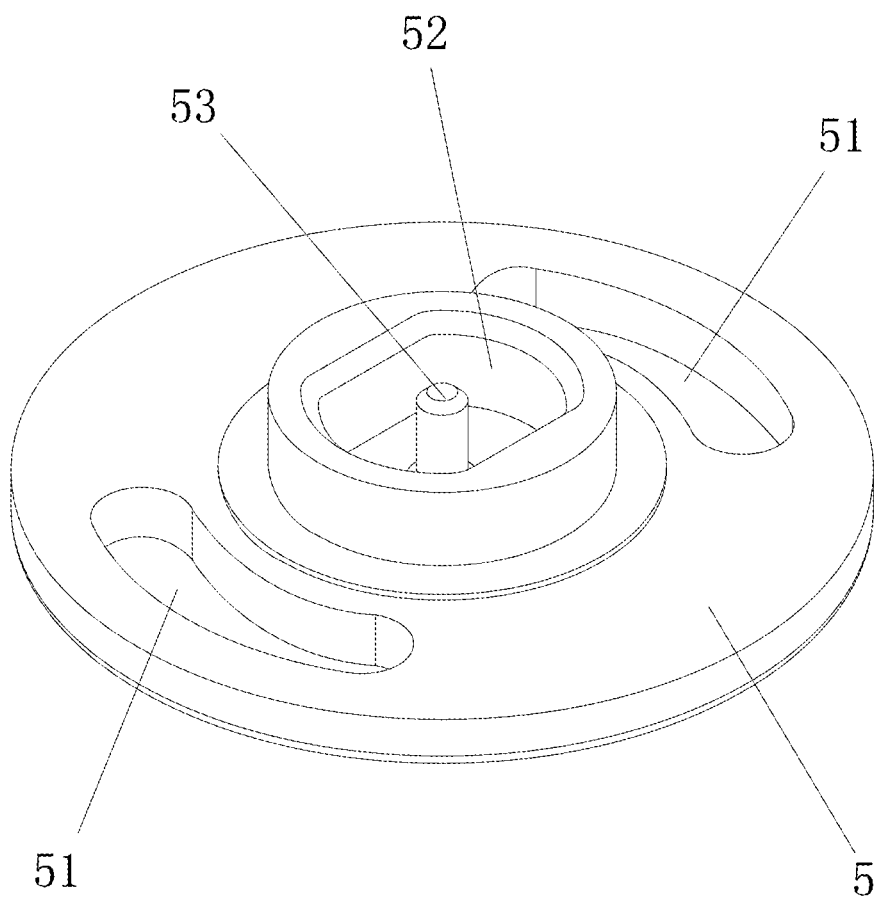
FIG. 8 is a perspective view of a water distribution pan.
Figure 9:
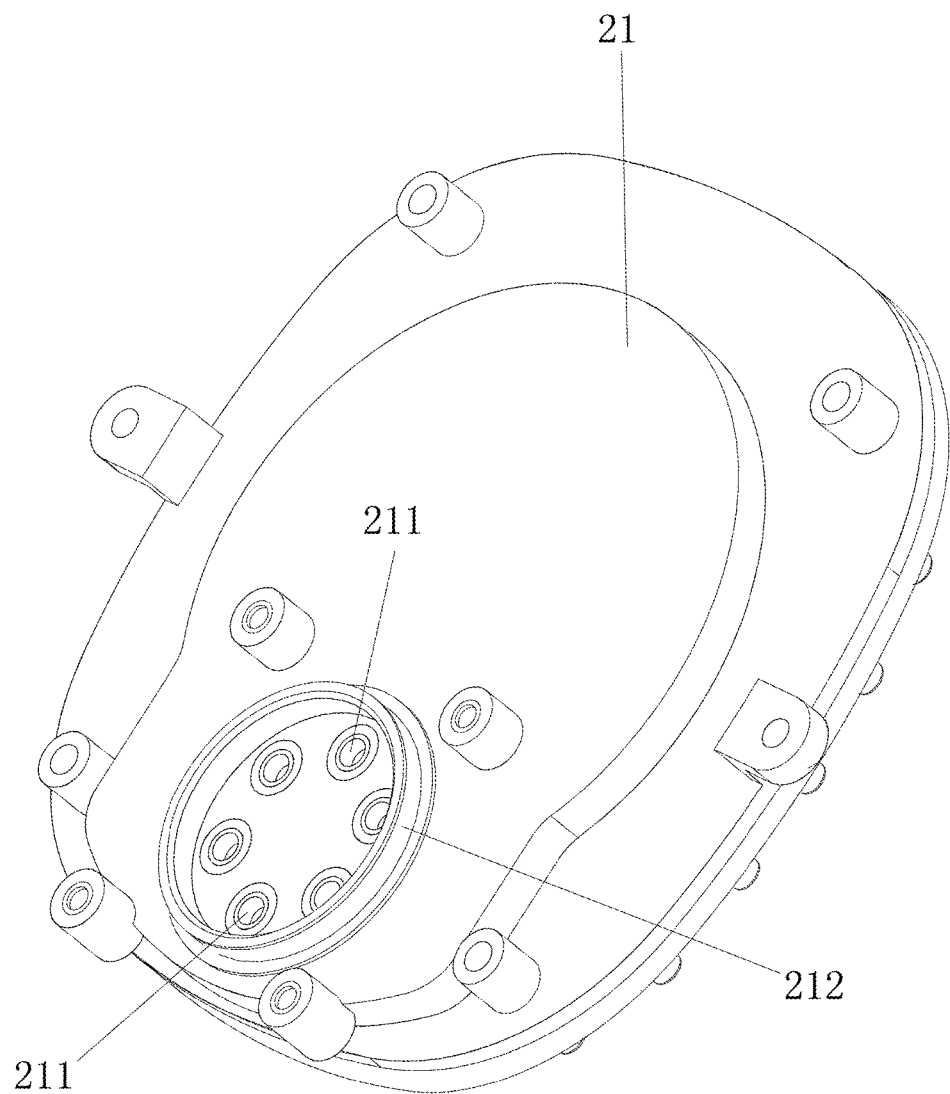
FIG. 9 is a perspective view of a water outlet base.
Figure 10:
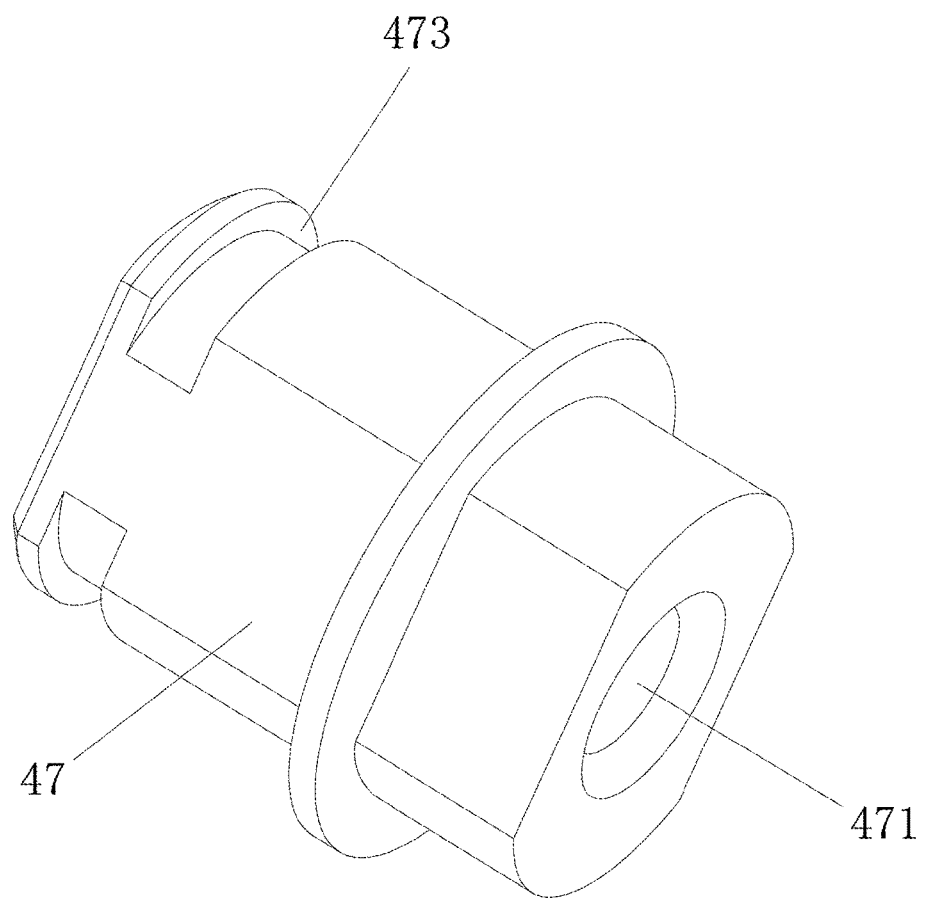
FIG. 10 is a perspective view of a driving shaft.
Figure 11:
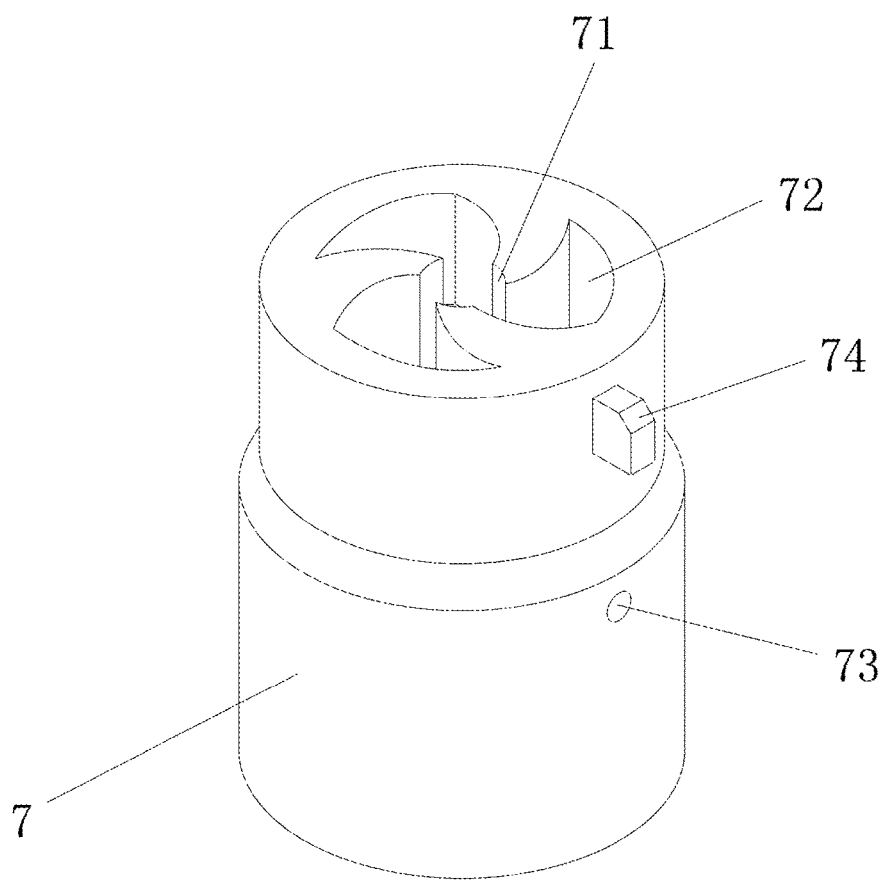
FIG. 11 is a perspective view of a water outlet column.
Figure 12:
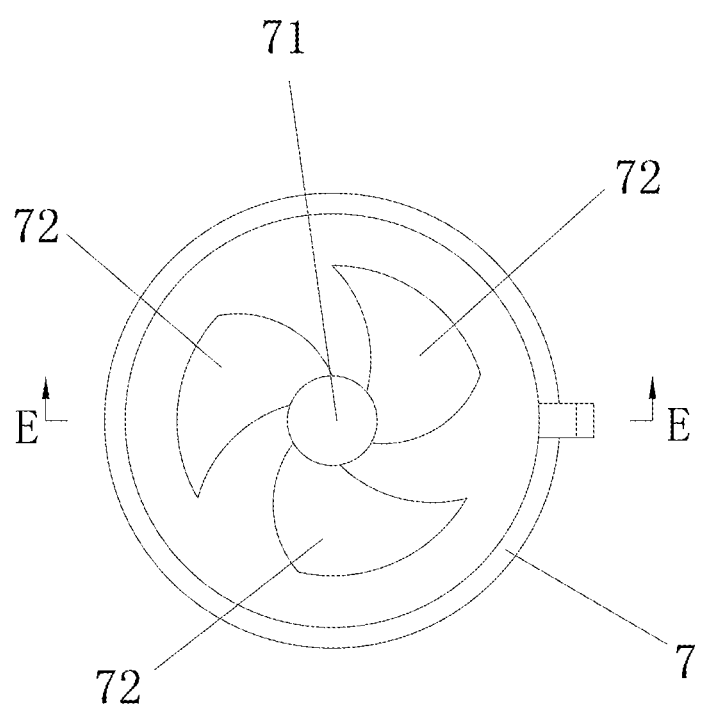
FIG. 12 is a top view of the water outlet column.
Figure 13:
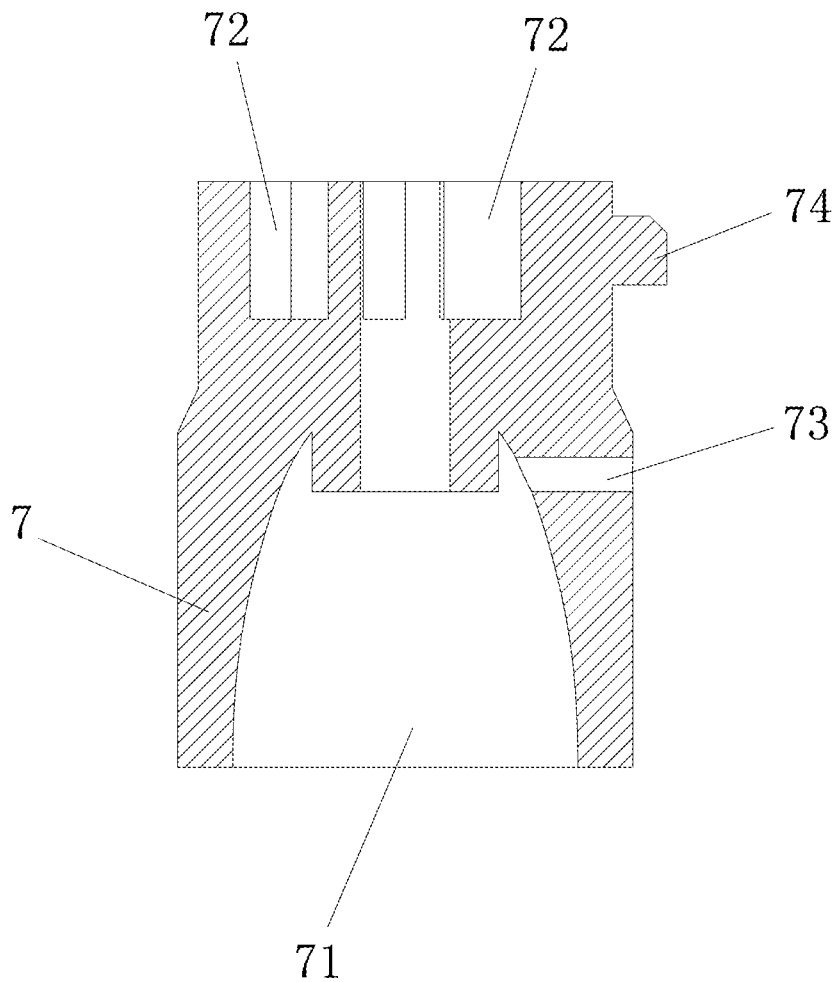
FIG. 13 is a sectional view taken along line E-E of FIG. 12.

As is shown in FIGS. 1-13, a handheld shower unit with the water outlet state switched through a key comprises a housing 1, wherein the housing 1 is provided with a handheld part 1a, a rear cover 1b is mounted on the rear portion of the housing 1, a water outlet assembly 2 is mounted at one end of the housing 1, and the water outlet assembly 2 is provided with three water outlet channels; a water inlet pipe 3 is mounted in the middle of the housing 1, one end of the water inlet pipe 3 stretches out of the housing 1 and is provided with a connecting external thread 31, a filter screen 32 and a flow-limiting component 33 are mounted in the middle of the water inlet pipe 3, and the water inlet pipe 3 communicates with the water outlet channels on the water outlet assembly 2 through a switching valve 4; the water outlet assembly 2 comprises a water outlet base 21, the water outlet base 21 is provided with six water inlets 211 and three water outlet channels, and each water outlet channel communicates with two water inlets 211; a first annular protrusion 212 is arranged on the side, close to a valve body, of the water outlet base 21, and the six water inlets 211 are formed in the portion, located in the first annular protrusion 212, of the water outlet base 21. The six water inlets 211 are evenly distributed on the same circumference, and a seal ring 2111 is inlaid in the periphery of each water inlet 211.

The switching valve 4 comprises a valve body 41, the key 42, a transmission swing rod 43, a sliding rod 44, a reset spring 45, a driving disc 46, a driving shaft 47, a ratchet wheel 48, a pawl 49 and a water distribution pan 5, wherein the valve body 41 is mounted in the housing 1, a second annular protrusion 411 is arranged on the side, close to the water outlet base 21, of the valve body 41 and connected with the first annular protrusion 212 in a sleeving mode, and a seal ring 4111 is arranged between the inner circumferential surface of the second annular protrusion 411 and the outer circumferential surface of the first annular protrusion 212; the water distribution pan 5 is located between the valve body 41 and the water outlet base 21 and is also located in the middle of the first annular protrusion 212, and one side of the water distribution pan 5 is close to one side of the water outlet base 21; two water distribution holes 51 are formed in the water distribution pan 5, and each water distribution hole 51 is in an arc shape and can communicate with one water inlet 211 or can communicate with the two water inlets 211 at the same time.

A water channel 412 is formed in the valve body 41, one end of the water channel 412 communicates with the water inlet pipe 3, and the other end of the water channel 412 communicates with the water distribution holes 51 on the water distribution pan 5; the key 42 is hinged to the valve body 41, can also be hinged to the housing 1 and is exposed out of the handheld part 1a of the housing 1, the transmission swing rod 43 is hinged to the valve body 41 and can also be hinged to the housing 1, and the key 42 abuts against the transmission swing rod 43; the driving shaft 47 is pivoted to the valve body 41 and fixedly connected with the ratchet wheel 48 and the water distribution pan 5 in the circumferential direction, the driving disc 46 is pivoted to the driving shaft 47, and the pawl 49 is hinged to the driving disc 46; one end of the sliding rod 44 is hinged to the driving disc 46, and the other end of the sliding rod 44 is connected with the transmission swing rod 43; the reset spring 45 is mounted between the valve body 41 and the sliding rod 44 and is a compression spring, and the reset spring 45 drives the sliding rod 44 to restore under the condition that the key 42 is not pressed;

the key 42 is pressed to drive the transmission swing rod 43 to rotate, the transmission swing rod 43 pushes the sliding rod 44 to move, the sliding rod 44 drives the driving disc 46 to rotate so that the pawl 49 hinged to the driving disc 46 can drive the ratchet wheel 48 to rotate, the ratchet wheel 48 then drives the driving shaft 47 and the water distribution pan 5 to rotate, and thus the water distribution holes 51 on the water distribution pan 5 can correspond to different water inlets 211 on the water outlet base 21.

A concave hole 471 is formed in one end of the driving shaft 47, and a groove 52 is formed in the middle of the side, close to the valve body 41, of the water distribution pan 5; one end of the driving shaft 47 is inserted into the groove 52, so that the driving shaft 47 and the water distribution pan 5 are fixedly connected in the circumferential direction; a first compression spring 472 is mounted in the concave hole 471, one end of the first compression spring 472 abuts against the water distribution pan 5, the other end of the first compression spring 472 abuts against the driving shaft 47, and the first compression spring 472 drives the water distribution pan 5 to draw close to one side of the water outlet base 21 of the water outlet assembly 2. The sealing performance can be effectively improved, and the water distribution reliability is improved. A convex boss 53 is arranged on the portion, in the groove 52, of the water distribution pan 5 and sleeved with part of the first compression spring 472, and thus the normal working condition of the first compression spring 472 is ensured.

A clamping groove 473 is formed in the outer circumferential surface of the other end of the driving shaft 47, a U-shaped ring 474 is mounted in the clamping groove 473, and the U-shaped ring 474 is used for preventing the ratchet wheel 48 and the driving disc 46 from disengaging from the driving shaft 47.

A sliding rail 413 is arranged on the valve body 41, and the middle portion of the sliding rod 44 is matched with the sliding rail 413, so that the reliability of the reciprocating motion of the sliding rod 44 is ensured. A stop pawl 6 is mounted on the valve body 41, one end of the stop pawl 6 is matched with a tooth groove of the ratchet wheel 48, and the stop pawl 6 is used for preventing the ratchet wheel 48 from rotating reversely.

The driving disc 46 is provided with a first protrusion 461 in the axial direction, and a second compression spring 462 is mounted between the first protrusion 461 and the pawl 49 and drives the driving end of the pawl 49 to lean against the tooth groove of the ratchet wheel 48; two angle limiting protrusions 414 are further arranged on the valve body 41, the driving disc 46 is provided with a second protrusion 463 in the radial direction, and the second protrusion 463 is matched with the two angle limiting protrusions 414 to limit the forward-rotation angle and the reverse-rotation angle of the driving disc 46. In this way, the rotation angle of the ratchet wheel 48 can be controlled easily, and the reliability of switching of the water outlet state is improved.

A first guide column 441 is arranged on the sliding rod 44, a second guide column 415 extends from the valve body 41, the first guide column 441 and the second guide column 415 are sleeved with the reset spring 45, and the first guide column 441 and the second guide column 415 are staggered in position, so that normal stretching and retracting of the reset spring 45 are ensured.

The middle portion of the side, away from the valve body 41, of the water outlet base 21 is fixedly connected with a water outlet column 7, the water outlet column 7 can also be integrally connected with the water outlet base 21, a water spray hole 71 is formed in the middle of the water outlet column 7, the portion, close to the outer side, of the water spray hole 71 is in the shape of a cone which becomes larger from inside to outside, the portion, close to the inner side, of the water spray hole 71 is cylindrical, the cylindrical circumferential surface of the inner side of the water spray hole 71 communicate with three water inlet grooves 72, the three water inlet grooves 72 communicate with one water outlet channel on the water outlet base 21, and water entering the water spray hole 71 can be spiral through the three water inlet grooves 72, and thus the water outlet area of the middle portion of the shower unit can be effectively enlarged.

Each water inlet groove 72 is a groove 52 which becomes larger from inside to outside and is approximately in the shape of a blade of a floor fan, and a radial air suction hole 73 is formed in the water outlet column 7 and communicates with the water spray hole 71. A locating protrusion 74 is further arranged on the outer circumferential surface of the water outlet column 7 so that the water outlet column 7 can be located on the water outlet base 21 accurately. Two sets of water outlets 213 are further formed in the water outlet base 21 and communicate with the two water outlet channels on the water outlet base 21 respectively.

In the embodiment, the shower unit is connected with an external water pipe through the external thread 31 of the water inlet pipe 3 in use, when water enters from the external water pipe, a user holds the handheld part 1a of the housing 1 with a single hand and then presses the key 42 with the thumb to drive the transmission swing rod 43 to rotate, the transmission swing rod 43 pushes the sliding rod 44 to move, the sliding rod 44 drives the driving disc 46 to rotate, the pawl 49 hinged to the driving disc 46 drives the ratchet wheel 48 to rotate, and the ratchet wheel 48 then drives the driving shaft 47 and the water distribution pan 5 to rotate so that the water distribution holes 51 on the water distribution pan 5 can correspond to different water inlets 211 on the water outlet base 21; when the key 42 is released by the thumb, the reset spring 45 drives the sliding rod 44 to restore, the sliding rod 44 then drives the driving disc 46 to rotate reversely to restore, and the driving disc 46 drives the pawl 49 to restore; in this way, the water distribution pan 5 can rotate by pressing or releasing the key 42, water can be switched to flow in different water outlet channels, and then waters can be sprayed out in different forms. By adoption of the handheld shower unit with the water outlet state switched through the key, single-hand operation is achieved, the switching speed is high, and the switching reliability is high.

The foregoing description is only one preferred embodiment of the invention, and all equivalent changes made by those skilled in the field according to the claims are within the protection scope of the invention.

What is claimed is:

1. A handheld shower unit with a water outlet state switched through a key, comprising a housing provided with a handheld part, wherein a water outlet assembly is mounted at one end of the housing and provided with a plurality of water outlet channels; wherein a water inlet pipe is mounted in a center of the housing and communicates with the water outlet channels on the water outlet assembly through a switching valve, and the water outlet assembly is provided with a plurality of water inlets communicating with the water outlet channels respectively;

the switching valve comprises a valve body, the key, a transmission swing rod, a sliding rod, a reset spring, a driving disc, a driving shaft, a ratchet wheel, a pawl and a water distribution pan, the valve body is mounted in the housing, the water distribution pan is located between the valve body and the water outlet assembly and provided with at least one water distribution hole, a water channel is formed in the valve body, one end of the water channel communicates with the water inlet pipe, and an opposite end of the water channel communicates with the water distribution holes on the water distribution pan;

the key is hinged to the valve body or the housing and exposed out of the housing, the transmission swing rod is hinged to the valve body or the housing, the driving shaft is pivoted to the valve body and fixedly connected with the ratchet wheel and the water distribution pan in a circumferential direction, the driving disc is pivoted to the driving shaft, the pawl is hinged to the driving disc, one end of the sliding rod is hinged to the driving disc, and the reset spring is mounted between the valve body and the sliding rod;

the key is pressed to drive the transmission swing rod to rotate, the transmission swing rod pushes the sliding rod to move, the sliding rod drives the driving disc to rotate so that the pawl hinged to the driving disc can drive the ratchet wheel to rotate, the ratchet wheel then drives the driving shaft and the water distribution pan to rotate, and thus the water distribution holes in the water distribution pan can correspond to different water inlets on the water outlet assembly.

2. The handheld shower unit with the water outlet state switched through the key according to claim 1, wherein a concave hole is formed in one end of the driving shaft, a groove is formed in a middle of a side of the water distribution pan, and one end of the driving shaft is inserted into the groove, so that the driving shaft and the water distribution pan are fixedly connected in the circumferential direction; a first compression spring is mounted in the concave hole, one end of the first compression spring abuts against the water distribution pan, another end of the first compression spring abuts against the driving shaft, and the first compression spring drives the water distribution pan to draw close to the water outlet assembly.

3. The handheld shower unit with the water outlet state switched through the key according to claim 2, wherein a clamping groove is formed in the outer circumferential surface of another end of the driving shaft, and a U-shaped ring is mounted in the clamping groove and used for preventing the ratchet wheel and the driving disc from disengaging from the driving shaft.

4. The handheld shower unit with the water outlet state switched through the key according to claim 2, wherein the driving disc is provided with a first protrusion in an axial direction, and a second compression spring is mounted between the first protrusion and the pawl and drives a driving end of the pawl to lean against a tooth groove of the ratchet wheel; two angle limiting protrusions are arranged on the valve body, the driving disc is provided with a second protrusion in the radial direction, and the second protrusion is matched with the two angle limiting protrusions to limit the forward-rotation angle and the reverse-rotation angle of the driving disc.

5. The handheld shower unit with the water outlet state switched through the key according to claim 1, wherein a sliding rail is arranged on the valve body, and a middle portion of the sliding rod is matched with the sliding rail; a stop pawl is mounted on the valve body, one end of the stop pawl is matched with a tooth groove of the ratchet wheel, and the stop pawl is used for preventing the ratchet wheel from rotating reversely.

6. The handheld shower unit with the water outlet state switched through the key according to claim 1, wherein a first guide column is arranged on the sliding rod, a second guide column extends from the valve body, the first guide column and the second guide column are sleeved with the reset spring, and the first guide column and the second guide column are staggered in position.

7. The handheld shower unit with the water outlet state switched through the key according to claim 1, wherein the water outlet assembly comprises a water outlet base, and the multiple water outlet channels are arranged on the water outlet base; a first annular protrusion is arranged on a first side of the water outlet base, a second annular protrusion is arranged on a side of the valve body and connected with the first annular protrusion in a sleeving mode, the water distribution pan is located in a middle of the first annular protrusion, and the multiple water inlets are formed in a portion, located in the first annular protrusion, of the water outlet base.

8. The handheld shower unit with the water outlet state switched through the key according to claim 7, wherein a middle portion of a second side, away from the valve body, of the water outlet base is fixedly connected with a water outlet column, a water spray hole is formed in a middle of the water outlet column, wherein a first portion of the water spray hole is cone-shaped which becomes larger from inside to outside, wherein a second portion of the water spray hole is cylindrical, the cylindrical circumferential surface of an inner side of the water spray hole communicate with a plurality of water inlet grooves, the water inlet grooves communicate with one water outlet channel on the water outlet base, and water entering the water spray hole can be spiral through the multiple water inlet grooves.

9. The handheld shower unit with the water outlet state switched through the key according to claim 8, wherein each water inlet groove becomes larger from inside to outside, and a radial air suction hole is formed in the water outlet column and communicates with the water spray hole.

10. The handheld shower unit with the water outlet state switched through the key according to claim 7, wherein the number of the water inlets is six, the six water inlets are evenly distributed on a same circumference, and the number of the water outlet channels on the water outlet base is three; each water outlet channel communicates with two water inlets, two water distribution holes are formed in the water distribution pan, and each water distribution hole is in an arc shape and communicate with one water inlet or can communicate with two water inlets at a same time.

\* \* \* \* \*